(12) United States Patent
Little (10) Patent No.: US 7,687,256 B2
(45) Date of Patent: Mar. 30, 2010

(54) SURFACE ACTIVATED BIOCHIP

(75) Inventor: Roger G. Little, Bedford, MA (US)

(73) Assignee: Spire Corporation, Bedford, MA (US)

( * ) Notice: Subject to any disclaimer, the term of this patent is extended or adjusted under 35 U.S.C. 154(b) by 0 days.

(21) Appl. No.: 10/120,974

(22) Filed: Apr. 11, 2002

(65) Prior Publication Data

US 2010/0004144 A1    Jan. 7, 2010

(51) Int. Cl.
   C12M 1/34    (2006.01)
   C12Q 1/68    (2006.01)
   G01N 33/53   (2006.01)
   C07H 21/02   (2006.01)
   C07K 1/00    (2006.01)

(52) U.S. Cl. .................. 435/287.1; 435/6; 435/7.1; 435/287.2; 536/23.1; 530/350

(58) Field of Classification Search .............. 435/6, 435/7.1, 91.1, 183, 283.1, 287.1, 287.2; 436/94, 436/501; 536/23.1, 24.3, 24.33, 25.3; 530/300, 530/350; 422/50, 68.1, 681
See application file for complete search history.

(56) References Cited

U.S. PATENT DOCUMENTS

| | | | | |
|---|---|---|---|---|
| 4,080,721 | A | * | 3/1978 | Hung .................. 438/285 |
| 5,030,474 | A | * | 7/1991 | Saita et al. ............. 427/2.27 |
| 5,206,516 | A | | 4/1993 | Keller et al. |
| 5,236,509 | A | | 8/1993 | Sioshansi et al. |
| 5,445,934 | A | | 8/1995 | Fodor et al. |
| 5,552,270 | A | | 9/1996 | Khrapko et al. |
| 5,734,018 | A | | 3/1998 | Rutter et al. |
| 5,800,992 | A | | 9/1998 | Fodor et al. |
| 5,807,522 | A | | 9/1998 | Brown et al. |
| 5,849,486 | A | | 12/1998 | Heller et al. |
| 5,851,772 | A | | 12/1998 | Mirzabekov et al. |
| 5,885,904 | A | | 3/1999 | Mehta et al. |
| 5,891,192 | A | * | 4/1999 | Murayama et al. ......... 623/1.48 |
| 5,891,656 | A | | 4/1999 | Zarling et al. |
| 5,904,575 | A | | 5/1999 | Ishida et al. |
| 5,929,208 | A | | 7/1999 | Heller et al. |
| 5,936,291 | A | * | 8/1999 | Makita et al. ............ 257/405 |
| 6,013,440 | A | * | 1/2000 | Lipshutz et al. ............. 435/6 |
| 6,040,138 | A | | 3/2000 | Lockhart et al. |
| 6,063,571 | A | | 5/2000 | Uhlmann et al. |
| 6,068,393 | A | | 5/2000 | Hutchins et al. |
| 6,156,501 | A | | 12/2000 | McGall et al. |
| 6,197,506 | B1 | | 3/2001 | Fodor et al. |
| 6,242,246 | B1 | | 6/2001 | Gold et al. |
| 6,309,823 | B1 | | 10/2001 | Cronin et al. |
| 6,310,189 | B1 | | 10/2001 | Fodor et al. |
| 6,406,921 | B1 | * | 6/2002 | Wagner et al. ............. 436/518 |
| 6,783,672 | B2 | * | 8/2004 | Tubbs et al. ............. 210/198.2 |
| 2002/0048531 | A1 | * | 4/2002 | Fonash et al. ............. 422/68.1 |
| 2002/0137085 | A1 | * | 9/2002 | Herrick ..................... 435/6 |

FOREIGN PATENT DOCUMENTS

| | | |
|---|---|---|
| EP | 0 619 321 A | 10/1994 |
| WO | WO 99 15895 A | 4/1999 |
| WO | WO 00/58522 | 10/2000 |

OTHER PUBLICATIONS

Attached definition for "ion implantation" from Wikipenia, the free encyclopedia.*
The definition for "microarray" from Wikipedia, the free encyclopedia. Printed on Sep. 18, 2009.*
Current Protocols in Molecular Biology. (John Wiley & Sons, New York, 1989). 6.3.1-6.3.6.
Sambrook, et al. Molecular Cloning, A Laboratory Manual, 2 ed. (Cold Spring Harbor Lab. Press, New York, 1989).
Heim, et al. "Engineering green fluorescent protein for improved brightness, longer wavelengths and fluorescence resonance energy transfer." Curr. Biol. 6: 178-182.
Mitra, et al. "Fluorescence resonance energy transfer between blue-emitting and red-shifted excitation derivatives of the green fluorescent protein." Gene 173: 13-17.
Selvin, Paul R. "Fluorescence Resonance Energy Transfer." Meth. Enzymol. 246: 300-345.
Waggoner, Alan. "Covalent labeling of proteins and nucleic acids with fluorophores." Meth. Enzymol. 246: 362-373.
Jameson, et al. "Fluorescent nucleotide analogs: synthesis and applications." Meth. Enzymol. 278: 363-390.

(Continued)

*Primary Examiner*—Frank W Lu
(74) *Attorney, Agent, or Firm*—Thomas J. Engellenner; Reza Mollaaghababa; Nutter McClennen & Fish LLP (57) ABSTRACT

The present invention provides substrates having a plurality of micro-locations on its surface. Each micro-location has an effective dose of an ion beam treatment such that the plurality of the micro-locations exhibit an affinity to a compound that is different from the affinity of the remainder of the substrate surface to that compound. The substrates of the invention can be utilized to form microarrays of biological molecules, such as oligonucleotides or peptides. Such microarrays can find a variety of applications. For example, they can be employed in large scale hybridization assays in many genetic applications, such as mapping of genomes, monitoring of gene expression, DNA sequencing, genetic diagnosis, and genotyping of organisms.

12 Claims, 3 Drawing Sheets

OTHER PUBLICATIONS de Prat-Gay, Gonzalo. "Association of complementary fragments and the elucidation of protein folding pathways." Protein Engineering 9: 843-847.

Matayoshi, et al. "Novel fluorogenic substrates for assaying retroviral proteases by resonance energy transfer." Science 247: 954-958.

Buckle, et al. "Structural and energetic responses to cavity-creating mutations in hydrophobic cores: observation of a buried water molecule and the hydrophilic nature of such hydrophobic cavities." Biochemistry 35: 4298-4305.

Stryer, Lubert "Fluorescence energy transfer as a spectroscopic ruler." Ann. Rev. Biochem. 1978, 47: 819-846.

Cantor, et al. Biophysical Chemistry Part II: Techniques for the study of biological structure and function (W. H. Freeman & Co., San Francisco 1980). pp. 448-455.

Langer, et al. "Enzymatic synthesis of biotin-labeled polynucleotides: novel nucleic acid affinity probes." Proc. Natl. Acad. Sci. USA 78: 6633-6637.

Haugland and Haugland. Handbook of Fluorescent Probes and Research Chemicals (http://www.probes.com/handbook/ 1996). Chapters 1-3, 7, 15, 18.

Chee, et al. "Accessing genetic information with high-density DNA arrays." Science 274: 610-614.

Drmanac, et al. "DNA sequence determination by hybridization: a strategy for efficient large-scale sequencing." Science 260: 1649-1652.

"*A Negative Ion Beam Application for Improving Biocompatibility of Polystyrene Surface*," Application of Accelerators In Research and Industry. Sixteenth International Conference, Denton, TX, USA Nov. 1-5, 2000, No. 576, pp. 1028-1031, AIP Conference Proceedings, 2001, AIP, USA.

* cited by examiner

SURFACE ACTIVATED BIOCHIP

BACKGROUND OF THE INVENTION

The present invention provides substrates on which a microarray of molecules, such as a microarray of oligonucleotides, can be formed, and further provides methods for generating such microarrays.

Microarrays of hundreds or thousands of biological compounds are widely utilized for biological analysis. Tiny droplets, each containing a different known reagent, usually distinct polynucleotide or polypeptide biopolymers, such as, known DNA fragments, can be deposited and immobilized in a regular array on a solid substrate, such as a glass microscope slide. The array of reagents can be exposed to an analyte solution containing unknown target sequences, for example, complementary DNA (cDNA) fragments, pre-labeled with fluorescent or radioactive chemical labels. Under certain conditions, binding reactions or hybridizations occur between a polynucleotide sequence in the array and a complementary sequence in the analyte. Subsequent optical or radiosensitive scanning procedures can be used to determine those position(s) in the microarray at which hybridization reactions have occurred, thereby identifying the complementary compounds present in the solution.

Various methods for immobilizing synthesized oligonucleotides or peptides on a substrate surface via chemical reactions are known. Such methods typically attach linking groups to a substrate surface at pre-defined locations, and connect known nucleotide or amino acid sequences to these linking groups, in order to create microarrays. One drawback of such methods is that the oligonucleotides or peptides in the microarrays are immobilized in particular configurations, which may inhibit optimal interactions between target sequences in test samples and the immobilized oligonucleotides or peptides.

Another known method of generating microarrays utilizes agarose gel pads placed at predefined locations on a flat surface. In one application of such microarrays, oligonucleotides of a known length and sequence are placed within each gel pad along with a test sample containing the target sequence. Each gel pad provides a three-dimensional environment in which the oligonucleotides and the target sequence in the test sample can react.

In many of the known methods for forming microarrays, the interactions between the immobilized molecules and their complementary counterparts can be hindered by the presence of linking groups, and/or the specific orientations of the immobilized molecules. Further, even in microarrays that utilize three-dimensional gel pads, although the oligonucleotides are not immobilized, the interactions between the oligonucleotides within the gel and the test sample are not optimal because they occur within the confines of a gel pad rather than in an aqueous solution.

In addition, conventional microarrays have limited densities largely as a result of the shortcomings of the methods utilized for generating them. For example, fixation of reagents on a substrate to form a microarray can require the presence of large bulky protective groups that often limit the density of the array. Likewise, when agarose gel pads are employed for forming a microarray, there is an upper limit for the density of gel pads on a substrate.

Accordingly, a need exists for microarrays in which optimal biological reactions can occur between reagents deposited in, or on, a micro-location of the array and a target molecule in a test sample. A need also exists for microarrays having higher densities of micro-locations suitable for containing reagents for biological reactions.

SUMMARY OF THE INVENTION

In one aspect, the present invention provides a bioanalytical microarray that includes a surface with a plurality of micro-locations in discrete region thereof, each of which is subjected to an ion beam treatment such that the location has a differential affinity for a compound than the remainder of the surface. The microarray further includes a plurality of macromolecules confined to the micro-locations.

The ion beam treatment can include, for example, implanting an effective dose of an ion, e.g., argon or nitrogen, in each micro-location such that the micro-location has an affinity for one or more selected compounds that is different than the affinity of the remainder of the surface, i.e, the portion of the surface not treated with an ion beam, for those compounds, or alternatively, each micro-location can be subjected to an ion beam assisted deposition (IBAD) process to selectively modify one or more of its properties.

The invention can be practiced on a variety of surfaces to form micro-locations thereon having modified surface properties. Such surfaces can include, for example, glass, silicon, nylon, an amino or carboxy activated plastic, cellulose, or a silane-coated glass, GaAs, GaN, metal-coated glass, such as silver or gold-coated glass. An ion implanted at a micro-location is typically selected based on the desired modification to the surface properties of that micro-location. Any ion that is amenable to implantation in a given surface, and leads to a desired surface modification can be utilized. Such ions include, but are not limited to, nitrogen, oxygen, argon, carbon, fluorine, chlorine, hydrogen, and helium. Further, more than one ion type can be implanted at a micro-location to modulate selected surface properties of that micro-location. The modified surface properties can include, for example, different wettability, i.e., hydrophilicity or hydrophobicity, or ionic binding relative to the remainder of the surface.

In a related aspect, the dose of the ion implanted at a micro-location is selected to be a range of about $10^{12}$ to about $10^{17}$ ions/cm$^{-2}$. Since the area of each micro-location will be typically smaller than a square centimeter, the actual dose of ions at each location will typically range from about $10^7$ to about $10^{14}$ ions per micro-location. The micro-locations formed on a surface in accordance with the teachings of the invention can have a wide range of densities. In general, the density of the micro-locations is selected based at least in part on the desired application. In many biological applications, the practical density for the micro-locations will be determined by the limitations of the reagent deposition process rather than the methods of the invention. It is expected that liquid droplet depositions can achieve a density of the micro-locations in a range of about 1000 cm$^{-2}$ to about 50000 cm$^{-2}$, although higher densities may also be attained. Array densities of up to about $10^4$-$10^6$ cm$^{-2}$ or higher can be obtained by utilizing the methods of the invention.

A variety of macro-molecules can be utilized for forming a bioanalytical micro-array according to the invention. Such macro-molecules include, but are not limited to, DNA and RNA nucleotide sequences, amino acid sequences, peptides, cell extracts, antibody epitopes and the like.

In other aspects, the invention provides a method for identifying the presence of a target molecule (i.e., an analyte) in a test sample. The method includes a step of providing a surface with a plurality of micro-locations formed in discrete regions thereof, where each micro-location has an effective dose of an ion implanted therein such that the location has a differential affinity for a compound vis-à-vis the remainder of the surface. A probe is deposited at each micro-location to generate a plurality of bound probes, each probe itself being capable of binding or otherwise reacting with the analyte. A test sample is then applied to these probes. The combination of the test sample and the probes is incubated under conditions that allow a target molecule, if present, to interact with at least one of the plurality of the probes. A detection signal from each micro-location is monitored such that an alteration in the detection signal at a micro-location indicates the presence of a target macro-molecule at that location, thereby identifying the presence of a target macro-molecule in the test sample. For example, the probes can comprise oligonucleotides having a detectable label, for example, a fluorescent marker, when the target molecule is a nucleic acid molecule.

In another aspect, the invention provides a method for identifying a suspected mutation in a target molecule in a test sample by providing a surface with a plurality of micro-locations formed in discrete regions thereof. Each micro-location has an effective dose of an ion implanted therein such that the location has an affinity for a compound that is different from the affinity of the remainder of the surface for that compound. A probe having a known sequence is deposited at each micro-location to generate a plurality of probes. Each probe has a known sequence that corresponds to a portion of the target sequence without a mutation (i.e., wild type sequence). A test sample containing a target molecule with a suspected mutation is applied to the probes, and the combination of the test sample and the probes is incubated under conditions that allow a target molecule with a suspected mutation to interact with the plurality of the probes. A detection signal from each micro-location is monitored. An alteration in the signal detected from at least one micro-location can thereby indicate the presence of a mutation in the target sequence.

Further understanding of the invention can be obtained by the following description of various embodiments of the invention and the accompanying drawings.

DETAILED DESCRIPTION

So that the invention may more readily be understood, certain terms are first defined:

The term "micro-location", as used herein, refers to a localized area on a substrate surface in which a dose of an ion has been implanted. A micro-location may have any convenient geometrical shape and/or surface topology, e.g., circular, rectangular, elliptical, wedge-shaped, conical, and the like. Further, a micro-location may be formed as a flat portion of a substrate surface, or alternatively, it can have a three-dimensional structure e.g., a well, a cavity, or depression, raised regions, etches, trenches, or the like.

The term "surface", as used herein refers to any material that is rigid or semi-rigid onto, or into which ions can be implanted or deposited using standard ion implantation techniques. Preferably, the surface is substantially flat, although curved surfaces can also be utilized in the present invention. Examples of suitable surfaces include, but are not limited to, glass, nylon, amino or carboxy activated plastics, cellulose, and the like. Other suitable surfaces can include, for example, surfaces of semiconductor substrates, such as, silicon (Si), gallium arsenide (GaAs), gallium nitride (GaN), and metal-coated glass, such as silver or gold-coated glass. A surface, as used herein, can also have a multi-layer structure, for example, a silane-coated glass surface.

The term "discrete regions", as used herein, refers to physically separate locations on a surface. Each micro-location exists in a discrete region of the surface.

The term "ion beam treatment," as used herein, refers to any treatment of a surface location by utilizing an ion beam, such as, implanting ions in a surface location or depositing ions on a surface location by exposing that location to an ion beam, or alternatively, depositing atoms or molecules on a surface location or implanting atoms or molecules in a surface location by subjecting that location to an ion beam assisted deposition process.

The term "effective dose", as used herein, refers to a concentration of implanted ions that can alter one or more surface properties of a location in which the ions are implanted. The effective dose may vary according to different ion types utilized for implantation. For example, an effective dose of nitrogen may be different than an effective dose of argon to produce a selected change in the surface properties of a portion of the substrate. Suitable effective dose ranges of implanted ions can be from about $10^{12}$ cm$^{-2}$ to about $10^{17}$ cm$^{-2}$.

The term "differential affinity", as used herein, refers to the difference between attractive or repulsive forces, exerted by one portion of a substrate surface and another portion of a substrate surface on compounds, macromolecules, or particles. As discussed in more detail below, in some embodiments of the invention, a plurality of micro-locations formed on a substrate surface in accordance with the teachings of the invention exhibit a differential affinity relative to the remainder of the substrate for selected substrates, compounds, macromolecules, or particles. The term "differential affinity" can also indicate a difference in the hydrophilicity or hydrophobicity between a plurality of micro-locations and the remainder of the substrate surface.

The term "macromolecules", as used herein, refers to large molecules such as biological molecules, for example, DNA, RNA, polypeptides, carbohydrates, antibodies, antibody epitopes, lectins and the like. The biological macromolecules can be naturally occurring macromolecules such as those isolated and purified from a subject. The term "macromolecules" is also intended to include chemically synthesized molecules such as polymers, oligonucleotides, and the like.

The term "nucleic acid molecule", as used herein, refers to a deoxyribonucleotide (DNA) or ribonucleotide (RNA) polymer in either single or double stranded form, and unless otherwise indicated, it encompasses known analogs of natural nucleotides which function in a similar manner as naturally occurring nucleotides, such as those with allelic variations.

The term "hybridize" or "anneal" as used herein refers to the physical interaction between complementary regions of two molecules, such as protein-protein interactions and nucleic acid-nucleic acid interactions. In particular, the term "hybridize" refers to interactions between two molecules under hybridization and washing conditions that allow complementary regions of the two molecules to remain engaged. The term "hybridization conditions" refers to temperature, solute concentrations and polarity of a given hybridization medium which provides detectable differences in hybridization rates between two oligonucleotides, each having between about 8 and 30 bases, and having at least one non-complementary, i.e., mismatch, base pair relative to one another.

Typically, the hybridization conditions are stringent conditions that are known to those skilled in the art and can be found, for example, in Current Protocols in Molecular Biology, John Wiley & Sons, N.Y. (1989), 6.3.1-6.3.6. A preferred, non-limiting example of stringent hybridization conditions are hybridization in 6× sodium chloride/sodium citrate (SSC) at about 45° C., followed by one or more washes in 0.2×SSC, 0.1% SDS at 50-65° C. Another example of high stringency conditions is hybridization in 50% formamide, 5×SSC, 25 mM potassium phosphate buffer (pH 7.4), 5×Denhardt's, and 50 μg/ml denatured salmon sperm DNA for 4-12 hours at 37° C., which is followed by hybridization for 12-24 hours at 37° C. and washing in 2×SSC containing 0.1% SDS, at 55° C., or an equivalent thereof.

One example of low-stringency hybridization condition is with 25% formamide, 5×SSC, 25 mM potassium phosphate buffer (pH 7.4), 5×Denhardt's, and 50 μg/ml denatured salmon sperm DNA for 4-12 hours at 37° C., which is followed by hybridization for 12-24 hours at 37° C. and washing in 2×SSC containing 0.1% SDS, at 42° C., or an equivalent thereof. See e.g., Sambrook, et al. Molecular Cloning, A Laboratory Manual, 2nd Ed. Cold Spring Harbor Laboratory Press, New York (1989), hereby incorporated by reference. These conditions can be modified as appropriate for use with specific microarrays.

The term "complementary", as used herein, refers to the topological compatibility or matching together of interacting surfaces of a target molecule and its probe. For example, the term "complementary" refers to nucleic acid-nucleic acid base pair interactions. For example, pairing interactions between two DNA molecules involves the bases adenine (A), guanine (G), thymine (T), and cytosine (C), such that A-T, and G-C pairing. The term "complementary" also includes peptide-peptide interactions, for example, a peptide probe that has an amino acid sequence which is an epitope for an antibody target molecule is complementary to that target molecule.

Figure 1:
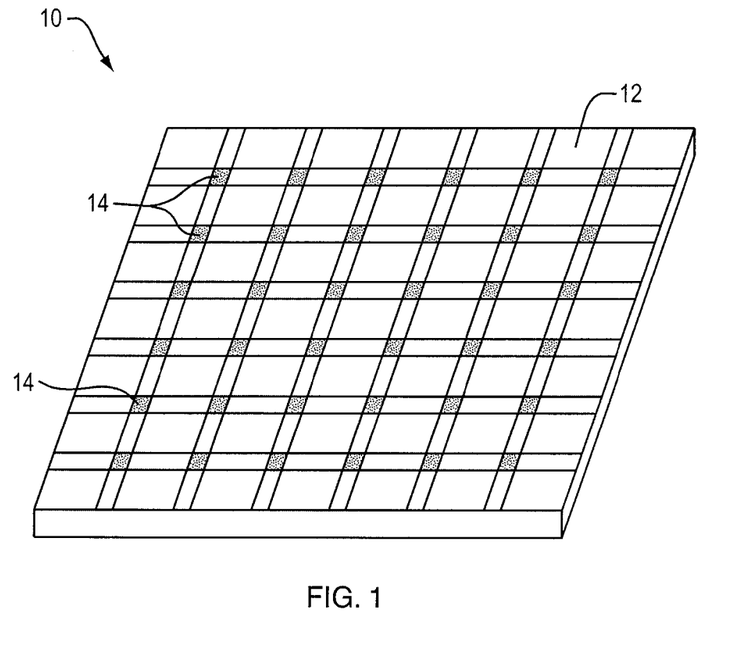
FIG. 1 is a schematic perspective view of a substrate having a plurality of micro-locations on its surface in accord with the teachings of the invention, FIG. 2 schematically illustrates a method according to the invention for forming the surface micro-locations shown in FIG. 1 by exposing the substrate surface to a beam of a selected ion through a mask placed over the substrate surface.

FIG. 1 schematically illustrates an exemplary substrate 10, such as glass or silane-coated glass, having a top surface 12 on which a plurality of micro-locations 14 are formed in accord with the teachings of the invention. Each micro-location 14 has an effective dose of an ion implanted therein such that the plurality of micro-locations 14 have an affinity for one or more compounds, such as DNA samples, that is different than the affinity of the remainder of the surface for these compounds. More particularly, the implanted ions modify one or more surface properties, e.g., wetability, of the substrate at the micro-locations such that the micro-locations have different affinity than the rest of the surface for selected compounds.

The effective dose of the implanted ions at each micro-location can be in a range of about $10^{12}$ to about $10^{17}$ ions/cm$^2$. More preferably, the effective dose can be in a range of about $10^{14}$ to about $10^{16}$ ions/cm$^2$. Further, a variety of ions, such as argon, nitrogen or oxygen, can be utilized for implantation at surface positions of a substrate corresponding to the micro-locations. In general, the type of the implanted ion and the implanted dose are selected based on the desired modification of the surface properties of the micro-locations. One such modification can relate to the wetability of the micro-locations when exposed to aqueous solutions. For example, a dose of nitrogen ions in a range of about $10^{15}$ to about $10^{16}$ ions/cm$^2$ can be implanted at selected surface positions to provide a plurality of micro-locations which are more hydrophilic than the remainder of the substrate surface. Alternatively, a dose of fluorine ions in a range of about $10^{12}$ ions/cm$^2$ to about $10^{17}$ ions/cm$^2$ can be utilized to create micro-locations that are more hydrophobic than the remainder of the surface.

The density of the micro-locations 14, that is, the number of micro-locations per unit area, can vary in accord with the intended use of the substrate 10. For example, in some embodiments of the invention, the surface 12 can include a few thousands micro-locations per square centimeter. In other embodiments, the density of the micro-locations can be in a range of about 1000 to about 100,000 per square centimeter. In yet other embodiments, the density of the micro-locations can be in a range of about 1000 to about 10,000. The surface area of each micro-location can also vary over a wide range in accord with the intended use. For example, each micro-location can have a surface area in a range of about a few micrometer square to about tens of micrometer square.

One method of the invention utilizes ion bombardment of selected positions on a substrate to implant an effective dose of a selected ion at these positions, thereby forming a plurality of micro-locations, such as those described above, on the substrate surface. More particularly, with reference to FIG. 2, in such a method, initially a mask, such as a shadow mask 16, is disposed over the substrate 10. The mask 16 is selected to be generally opaque to the selected ion and to have a plurality of openings, such as, openings 18a, 18b, and 18c, herein collectively referred to as openings 18, which allow exposure of selected positions of the substrate surface, which are in register with the openings 18, to a beam 20 of an ion, such as, nitrogen.

A variety of different substrates and masks can be utilized to practice the invention. For example, a plurality of micro-locations can be formed on a silane-coated silicon substrate in accordance with the teachings of the invention. Other suitable substrates can include, but are not limited to, glass, nylon, amino or carboxy activated plastics and cellulose, semiconductor substrate surfaces, such as, silicon, gallium arsenide, gallium nitride, and metal-coated glass, such as silver or gold-coated glass.

Figure 2:
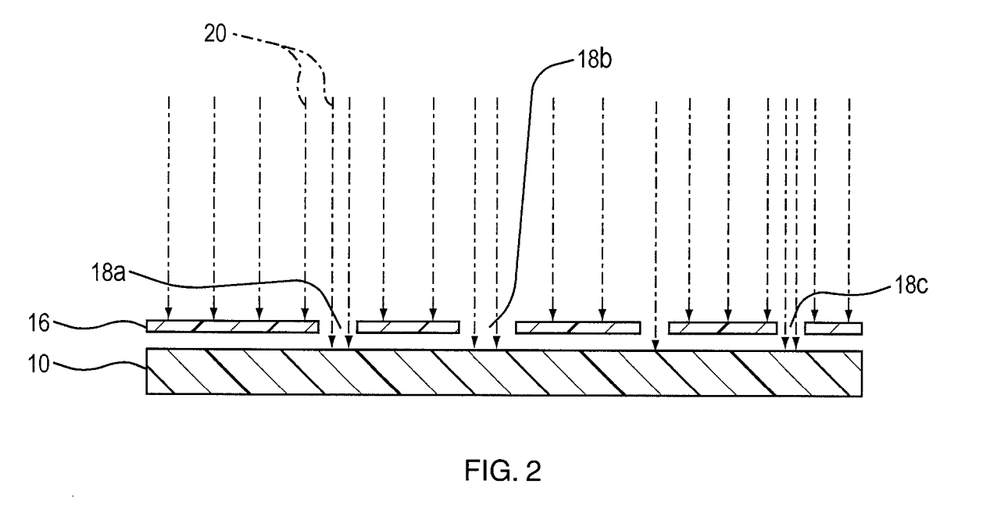

Further, a variety of masks can be utilized to selectively expose different portions of a substrate surface to an ion beam. For example, the exemplary shadow mask 16 can be formed of silicon dioxide (SiO$_2$). In another embodiment, a mask formed of silicon oxide can be deposited on a silicon substrate, for example, by utilizing chemical vapor deposition (CVD). The silicon oxide mask can then be patterned by employing a number of known methods, such as photolithography, to generate a plurality of openings therein. The substrate is then exposed to a beam of ions, such as nitrogen, to create micro-locations at those positions on the substrate which are in register with the openings in the mask. In other embodiments, resist materials employed in photolithography can be patterned to form masks suitable for use in the present invention. One advantage of such masks is that they can allow generating micro-locations, via ion implantation, with very high densities.

With continued reference to FIG. 2, the ion energy can be selected to be in a range of about 0.1 keV to about 1000 keV. Typically, the ion density and energy are chosen so as to implant a predetermined dose of the ion in each position exposed to the ion beam through one of the openings in the mask 16. A variety of ion implantation systems known in the art can be employed for practicing the method of the invention for creating a plurality of micro-locations on a substrate surface.

Figure 3:
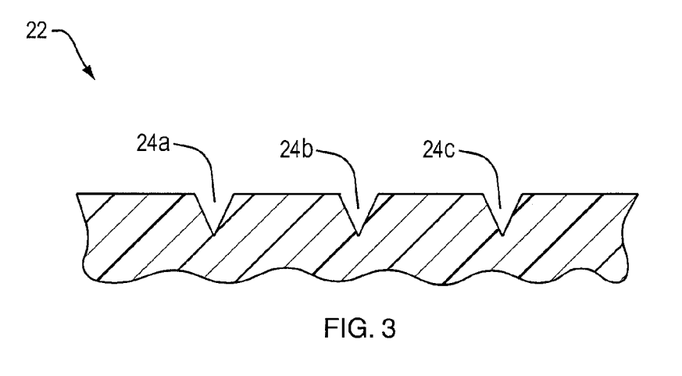
FIG. 3 is a partial cross-sectional view of a substrate in accord with the teachings of the invention schematically illustrating the surface topography of a few exemplary micro-locations present on the substrate surface, FIG. 4 schematically illustrates a substrate over which a mask having a plurality of openings in the form of elongated strips are disposed to allow exposure of the corresponding strip-shaped portions of the substrate surface to an ion beam, thereby modifying selected surface properties of these portions, FIG. 5A schematically presents a cross-sectional view of a conventional micro-location in the form of a conical well in which a droplet of an aqueous solution is placed, and FIG. 5B schematically presents a cross-sectional view of a micro-location of the invention in the form of a conical well having a dose of an ion implanted therein in which a droplet of an aqueous solution is placed.

The micro-locations formed on a substrate in accord with the teachings of the invention can have a variety of geometrical shapes, and can also have different three-dimensional structures. For example, the micro-locations can be flat surface portions. Alternatively, the micro-locations can be formed as physical wells created in the substrate, and implanted with a selected ion. As an exemplary illustration, FIG. 3, shows a cross-sectional view of a substrate 22 having a plurality of micro-locations 24a, 24b, 24c, . . . , herein collectively referred to as micro-locations 24, in the form of wells created in the top surface of the substrate. Each well has a conical structure and has an effective dose of an ion, e.g., nitrogen, implanted therein. Those skilled in the art will appreciate that the three-dimensional structure of the wells 24 is not limited to conical, but can assume any structure suitable for a desired application.

As discussed above, each position on the substrate surface in which an effective dose of a selected ion is implanted, i.e., each micro-location, differs in certain surface properties from the rest of the substrate. For example, the micro-locations can be more hydrophilic than the rest of the substrate. That is, the difference between the surface energy of each micro-location and the rest of the substrate can allow each micro-location to act as a potential energy well for a selected compound, e.g., water.

In some embodiments of the invention, a selected number of micro-locations are formed on a substrate surface by implanting one ion type, e.g., nitrogen, in certain discrete regions of the substrate while other micro-locations are formed on the substrate surface by implanting another ion type, e.g., argon, in other discrete regions. This results in generating a substrate having two types of micro-locations. The ions can be selected such that the two types of micro-locations have different surface properties relative to one another and also relative to the remainder of the substrate surface. For example, one set of the micro-locations can be formed by implantation of nitrogen ions and another set by implantation of argon ions. Further, in some embodiments of the invention, more than one ion type is implanted at each discrete region of a substrate surface corresponding to a micro-location.

Figure 4:
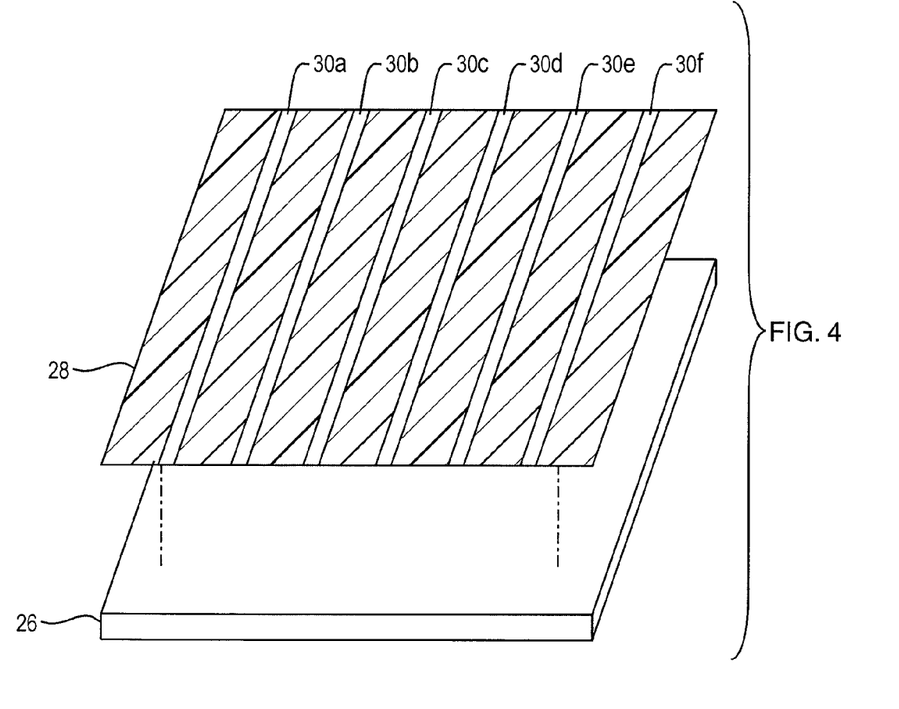

In another embodiment of the invention, ion implantation is utilized to form one or more strips on a substrate surface having a different surface property, e.g., an increased hydrophilicity, relative to the remainder of the substrate surface. For example, FIG. 4 illustrates a substrate 26 over which a mask 28 having a plurality of openings 30a, 30b, 30c, 30d, 30e, and 30f, herein collectively referred to as openings 30, in the form of elongated strips is disposed.

A dose of a selected ion, such as, nitrogen, can be implanted in portions of the substrate surface that are aligned with the openings 30, for example, by bombarding the masked substrate with a beam of nitrogen ions. The implantation of the selected ion in these substrate portions results in modification of one or more selected properties of these portions, thereby generating strips of the substrate surface having modified surface properties. For example, strips of the substrate surface having an increased hydrophilicity can be generated in this manner.

Ion beam surface treatment techniques that can be utilized to produce a bioanalytical array of the invention are not limited to ion implantation by exposing a surface location to a beam of the ion being implanted. For example, in some embodiments, an ion beam assisted deposition process (IBAD) can be employed to cause selected atoms to be embedded within and/or upon a surface location. For example, an IBAD process can be employed in which an ion source can accelerate ions into selected portions of a growing film formed on a surface by physical vapor deposition. The resulting collisions mix the film atoms with the surface and cause the film atoms to be embedded in and/or on the selected portions of the surface that are subjected to the ion beam. U.S. Pat. No. 5,520,664, herein incorporated by reference, provides further details regarding IBAD process and apparatus therefor.

The differences in the surface properties of the ion beam treated locations, e.g., ion-implanted locations, and the remainder of the substrate surface can be utilized in a variety of applications, as discussed in more detail below. In one embodiment, an array of macromolecules, such as, an array of oligonucleotides, can be formed on a substrate surface of the invention at the positions of the micro-locations. Such an array can be formed, for example, by depositing a droplet of an aqueous solution containing a macromolecule at each of a plurality of micro-locations, which are designed to be more hydrophilic than the rest of the substrate surface. The high hydrophilicity of the micro-locations inhibits the spread of the droplets to the remainder of the substrate, and hence effectively confines the droplets to the micro-locations.

Microarrays of biological macromolecules, formed in accord with the teachings of the invention, can be utilized in a variety of different applications. For example, microarrays of immobilized nucleic acid sequences can be employed in large scale hybridization assays in many genetic applications, such as mapping of genomes, monitoring of gene expression, DNA sequencing, genetic diagnosis, and genotyping of organisms. Such microarrays can also be utilized to identify optimal therapeutic protocols for early and rapid detection of a variety of disease states.

In some embodiments, microarrays can be created on a substrate surface by depositing pre-synthesized probes (e.g., oligonucleotide probes or peptide probes) onto the micro-locations. Oligonucleotides or peptides can be synthesized, for example, by employing an automated nucleotide or peptide synthesizer, such as the Applied Biosystems Instruments (ABI) Synthesizer (See e.g., U.S. Pat. No. 5,734,018 and U.S. Pat. No. 6,063,571). The deposition of the probes on the micro-locations can be accomplished by employing any standard technique, for example, utilizing robots for deposition onto the micro-locations.

In one application, a microarray of probes deposited at micro-locations of a substrate surface of the invention can be utilized to detect the presence of a target macromolecule in a test sample. When the target macromolecule is a nucleotide sequence, the probes can be oligonucleotide probes having different nucleotide sequences. The oligonucleotide probes typically include a region of nucleotide sequence that can hybridize under stringent conditions to at least about 12 or 15, preferably about 20 or 25, and more preferably about 30, 35, 40, 45, 50, 55, 60, 65, or 75 consecutive nucleotides of a target nucleotide sequence. An oligonucleotide probe can be, for example, about 5, 10, 15, 20, 25, 30, 35, 40, 45 or 50 nucleotides in length, and can be prepared, for example, by utilizing enzymatic ligation reactions known in the art. The oligonucleotide probes can be prepared from naturally occurring nucleotides, such as those that increase the biological stability of the molecules. Alternatively, the oligonucleotide probes can be synthesized using an automated nucleotide synthesizer, such as an ABI synthesizer.

Microarrays of oligonucleotide probes can be employed for sequencing-by-hybridization (SBH) on genomic DNA fragments or other nucleic acid molecules. Microarrays of oligonucleotide probes can also be used to detect mutations in a target nucleotide sequence for which the normal or "wild-type" nucleotide sequence is already known. Mutations or polymorphisms associated with phenotypic changes having clinical significance in human patients may also be investigated by utilizing a micro-array of probes on a substrate of the invention. For example, the cystic fibrosis transmembrane conductance regulator (CFTR) gene and P53 gene in humans have been identified as the location of several mutations resulting in cystic fibrosis or cancer, respectively (See e.g., U.S. Pat. No. 6,309,823). In such applications, each micro-location can have a different oligonucleotide probe deposited thereon, thereby creating a microarray with a plurality of different oligonucleotide probes. A test sample with a target nucleic acid can be added to the array of oligonucleotide probes to hybridize under conditions that allow complementary sequence interactions to take place. The hybridization pattern can reveal the identity of all target nucleic acid sequences that are complementary to one or more probes. Both the presence of a target nucleic acid and its sequence can be discerned from the hybridization pattern.

Where the microarrays are used to detect mutations or polymorphisms, a number of oligonucleotide probes corresponding to regions of the known nucleotide sequence of the wild type gene, e.g., the CFTR gene, can be generated. Each probe with a specific sequence can be placed in a separate micro-location. A test sample containing, for example, a CFTR gene with a suspected mutation, can be applied to the microarray of probes. The presence of the polymorphism or mutation can be detected based on comparison of the illumination pattern of a microarray incubated with a gene suspected to have a mutation with e that of a microarray incubated with the wild type gene. An alteration in the detectable signal in a particular micro-location indicates a polymorphism or mutation in a particular region of the gene corresponding to the probe sequence at that microlocation. The sequence of the polymorphic or mutated gene may be discerned by combining the sequences of the oligonucleotide probes from each micro-location that produces a detectable signal.

The hybridized target sequences can be detected by utilizing any method that provides a detectable signal. For example, the hybridized target sequences can be detected by utilizing one or more detectable marker labels or chemicals, such as dyes, fluorescent chemicals, radioisotopes, or other markers. Such detection methods are well known in the art. For example, Gold et al. in U.S. Pat. No. 6,242,246 B1, incorporated herein by reference, describes a detectable system that monitors a change in fluorescence, or a change in a physical parameter, such as electrical conductance or refractive index, at each location on a biochip.

In one embodiment, a hybridization pattern is discerned by scanning the surface of a micro-array to detect the presence of the detectable markers at one or more of the micro-locations forming the micro-array. For example, the detection of a fluorescent signal at a micro-location can signify the presence of a target nucleic acid sequence that is complementary to at least a portion of a probe at that location. In another embodiment, a hybridization pattern is discerned by scanning the surface of the microarray to detect the absence of a detectable marker at one or more micro-locations forming the microarray.

One embodiment of the invention utilizes a detection method that employs an energy transfer pair of markers, such as those involved in fluorescent resonance energy transfer (FRET) assays. FRET is a useful assay for detecting interactions between molecules (See e.g., Heim et al., (1996) *Curr. Biol.* 6:178-182; Mitra et al., (1996) *Gene* 173:13-17; Selvin et al., (1995) *Meth. Enzymol.* 246:300-345). As used herein, "FRET energy transfer pair" includes a first member which is a donor molecule, and a second member which is an acceptor molecule. The donor and acceptor molecules can form a fluorescence resonance energy transfer relationship when they are in close proximity of one another.

A FRET assay measures a change in fluorescence caused by a change in the distance separating the donor molecule (e.g., a first fluorophore) from an interacting resonance energy acceptor molecule (either another fluorophore or a quencher). The mechanism of FRET energy transfer pair interaction requires that the absorption spectrum of one member (donor molecule) of the pair overlaps the emission spectrum of the other member (acceptor molecule). (See e.g., Stryer, L., "Fluorescence Energy Transfer as a Spectroscopic Ruler," Ann. Rev. Biochem. 1978, 47: 819-846 ("Stryer, L. 1978"); Biophysical Chemistry part II, Techniques for the Study of Biological Structure and Function, C. R. Cantor and P. R. Schimmel, pages 448-455 (W. H. Freeman and Co., San Francisco, U.S.A., 1980) ("Cantor and Schimmel 1980"), and Selvin, P. R., "Fluorescence Resonance Energy Transfer," *Methods in Enzymology* 246:300-335 (1995) ("Selvin, P. R. 1995")).

In FRET, a donor molecule (e.g., a fluorophore) absorbs radiation at a first wavelength and emits radiation at a second, typically longer, wavelength. The acceptor molecule or quencher, which is proximate to the donor molecule (the FRET range is reportedly about 10-100 Å) and has an absorption spectrum that overlaps the emission spectrum of the donor molecule, absorbs some or most of the energy emitted by the donor molecule. If the acceptor molecule is a fluorophore, it re-emits the energy at a third, still longer wavelength. If the acceptor molecule is a quencher, it releases the energy as heat.

Commercially available fluorophores and their derivatives can be employed to label proteins or nucleotides. The fluorophores can be either synthetic, relatively low-molecular organic compounds (e.g. fluorescein and rhodamine and derivatives thereof, and lanthanide chelates) or proteins (e.g. phycoerythrin, and green fluorescent protein (GFP)). Various parameters of the fluorescence emitted by the fluorophores can be measured, such as, fluorescence intensity, life-time, polarization. These can also be used to monitor and quantitate the FRET phenomenon.

Examples of fluorophores, such as fluoresceins include, but are not limited to 6-carboxyfluorescein (6-FAM), 2',4',1, 4,-tetrachlorofluorescein (TET), 2',4',5',7',1,4-hexachlorofluorescein (HEX), 2',7'-dimethoxy-4',5'-dichloro-6-carboxyrhodamine (JOE), 2'-chloro-5'-fluoro-7',8'-fused phenyl-1, 4-dichloro-6-carboxyfluorescein (NED) and 2'-chloro-7'-phenyl-1,4-dichloro-6-carboxyfluorescein (VIC).

A quencher moiety is a moiety whose absorption spectrum at least partially overlaps the fluorescence spectrum of a donor molecule such that the fluorescence of the donor molecule is substantially absorbed, that is, quenched by the quencher moiety, when the moiety is in proximity of the donor molecule during fluorescence resonance energy transfer (FRET). Examples of quenchers include, but are not limited to, rhodamine dyes such as tetramethyl-6-carboxyrhodamine (TAMRA), tetrapropano-6-carboxyrhodamine (ROX); DABSYL, DABCYL, and cyanine dyes such as nitrothiazole blue (NTB), anthraquinone, malachite green, nitrothiazole, and nitroimidazole compounds and the like.

One example of a FRET energy transfer pair as disclosed in Matayoshi et al. 1990, *Science* 247: 954-958, and incorporated herein by reference, includes DABCYL as a quenching moiety and EDANS as a fluorophore. The absorption spectrum of DABCYL has a high degree of overlap with the emission spectrum of EDANS.

Fluorescent nucleotide analogs can be introduced into a oligonucleotides during synthesis (Jameson & Eccleston (1997) *Meth. Enzymol.* 278: 363-390). In another embodiment, fluorescent dyes can be attached to oligonucleotides via reactive groups on the DNA and the dye (Langer et al. (1981) *Proc. Natl. Acad. Sci. U.S.A.* 78: 6633-6637; Waggoner (1995) *Meth. Enzymol.* 246: 362-373).

To label proteins, amino acids with reactive side chains can be introduced at strategic points into proteins by protein engineering techniques (see, Buckle et al. (1996) *Biochemistry* 35: 4298-4305; de Prat-Gay, (1996) *Protein Engineering* 9: 843-847). These reactive side chains can be further fluorescently labeled by techniques known in the art (see, e.g., Haugland, "*Handbook of Fluorescent Probes and Research Chemicals*" (1996) Chapters 1-3, 7, 15, 18).

The microarrays can be composed of one member of a probe pair labeled with one member of a FRET energy transfer pair. A "probe pair" consists of first and second members of oligonucleotides that are completely complementary to each other. The first member of the probe pair can have a first member of the FRET energy transfer pair (e.g., donor molecule) attached at one end (e.g., the 3' end), while the second member of the probe pair can have the second member of the FRET energy transfer pair (e.g., an acceptor molecule) attached at one end (e.g., the 5' end). When the two members of the probe pair anneal to each other, the first and second members of the FRET energy transfer pair are brought into close proximity. When the members are illuminated by light having an appropriate wavelength, the FRET phenomena occurs between the FRET energy transfer pair, and a detectable signal is generated. In another embodiment, the second member of the FRET energy transfer pair is a quencher, and when the two members of the probe pairs anneal to each other, the fluorescence is quenched by the quenching moiety.

In one embodiment, a first set of oligonucleotide probes are pre-synthesized and labeled with a first member of an energy transfer pair of markers, e.g., a FRET energy transfer pair of markers. This first set of oligonucleotides is disposed at each micro-location to create a microarray of oligonucleotide probes. A target DNA can be added to the microarray of probes, and be allowed to hybridize under conditions that permit complementary sequence interactions to take place. A second set of oligonucleotide probes that are complementary to the first set of oligonucleotides probes can be synthesized and labeled with a second member of the FRET energy transfer pair of markers. The second set of oligonucleotide probes, can be introduced into each micro-location that contains the corresponding oligonucleotide probe. The second set of probes will be free to bind to their complements at each location where a binding reaction with a target DNA has not already occurred and competitive binding interactions will result in the displacement of non-complementary target DNA sequences from the first set of oligonucleotide probes at locations where weak hybridization matches have occurred. Thus, the second set of complementary oligonucleotide probes, labeled with the second member of the FRET energy transfer pair, will anneal to the first set of oligonucleotide probes everywhere except at the locations where the target DNA has strongly hybridized to a particular oligonucleotide probe of the array.

When the first and second members of the energy transfer pair are fluorophores, FRET will occur and produce a detectable fluorescent signal. When the second member of the energy transfer pair at a micro-array position is a quencher, it will quench a fluorescent signal emitted from the first member, when in close proximity of the first member, thereby eliminating the signal at that position in the micro-array. Thus, the absence of a FRET signal at a micro-location can be indicative of the lack or partial complementarity of the target with the probe at that location.

Further manipulation of complementary complexes may also take place on the microarray. For example, an oligonucleotide probe disposed at a micro-location, to which a target nucleic acid sequence has hybridized, can act as primer sequence for further amplification reactions. The target nucleic acid sequence acts as a template, along which an extension reaction, initiated, e.g., by standard PCR procedures and reagent, occurs. The amplification reaction conditions, such as temperature, ionic strength, and pH, can be selected so as to permit a polymerase reaction to take place by applying thermally stable polymerase, nucleotides, and other necessary reagents. The amplification product may incorporate a detectable marker label.

In other embodiments, microarrays of the invention can be used to determine antibody epitopes. This involves the use of primary antibodies, i.e., those which bind to an epitope (e.g., a rabbit anti-protein antibody), and labeled secondary antibodies, i.e., those which bind to a primary antibody (e.g., a goat anti-rabbit antibody linked to a detectable label, See e.g., U.S. Pat. No. 5,891,656). In these embodiments, small regions of a primary antibody, for example, regions of about 6 amino acids in length, can be synthesized and deposited in each micro-location. This creates a microarray of hexapeptides which contains at least one epitope for the primary antibody, that will allow high affinity binding between the hexapeptide and the primary antibody. The primary antibody is deposited over the hexapeptide array and the peptide-primary antibody interaction is allowed to occur in a first incubation step. After the first incubation step, the peptide-primary antibody complex is exposed to a fluorescently labeled secondary antibody that recognizes, and binds to the primary antibody in a second incubation step. Following the second incubation step, the surface of the microarray is scanned for fluorescence signals, for example, by utilizing a fluorescent microscope, to reveal bright and dark areas on the microarray. Each bright area of the microarray indicates a hexapeptide that is an epitope for the primary antibody.

The presence or lack of a fluorescent signal at microlocation can be detected by directing light from a light source, such as a laser light source of the type well known to those of skill in the art, to that micro-location. The light incident on the micro-location can cause the emission of a fluorescent signal from that location that can be detected by a detector appropriately placed over the substrate. Alternatively, such a detector may detect no fluorescent signal signifying a lack of fluorescence at that location.

A detector typically detects the intensity of fluorescent light emitted from molecules disposed on the substrate as a function of position. In one embodiment, the detector is a CCD array of a type commonly known to those skilled in the art (See e.g., U.S. Pat. No. 6,310,189, incorporated herein by reference). The CCD array can be used in conjunction with an x-y translation stage, in which a light source, and the detector are all operably connected to a computer or equivalent for control of the device and data collection from the CCD array. In operation, the microarray is appropriately positioned by the translation stage. The light source then illuminates the substrate surface, and intensity data is gathered by the computer via the detector.

Data can be collected as an image data file and then outputted for display. The output from the data collection system can be, for example, in the form of an array indicative of fluorescent intensity versus location on the microarray.

A microarray according to the invention provides a number of advantages. For example, FIGS. 5A and 5B contrast the disposition of an aqueous sample of compound, e.g., DNA, in a surfactant-wetted well 32 in a conventional array with that in a well 34 of a microarray according to the invention which includes a bottom portion having a dose of an implanted ion. The effective confinement of the sample provided by the surface properties of the ion-implanted portion of the well 34 allows utilizing significantly less sample to wet this well. This can be particularly advantageous when the sample is rare or difficult to isolate.

Figure 5A:
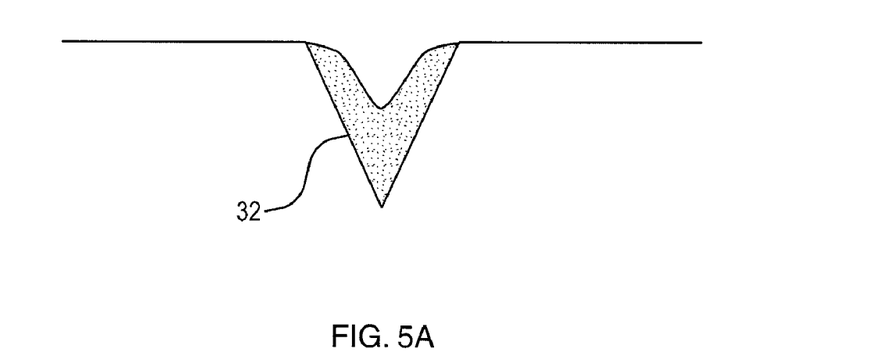
Figure 5B:
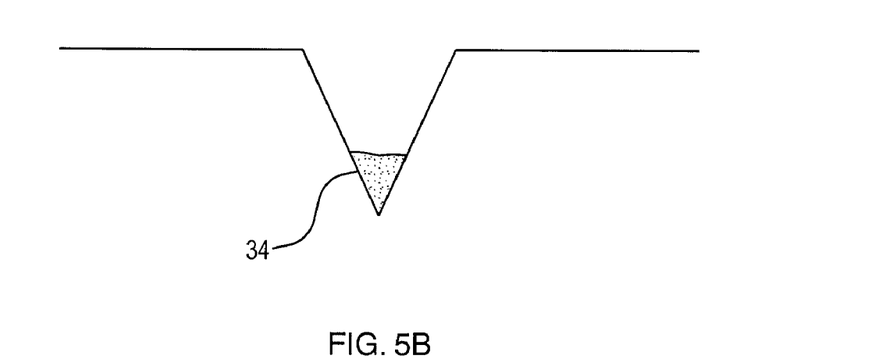

Further, the upper surface of the sample confined in the well 34 is less curvilinear than that of the sample confined in the conventional cell 32. This results in a better signal to noise ratio when fluorescence signals are utilized in hybridization experiments.

Another advantage of a substrate having micro-locations according to the invention is that such a substrate is easy to manufacture, is durable and can be re-used for different experiments. In addition, such a substrate permits confinement of an aqueous sample at the micro-locations, thereby allowing solution phase chemistry to be performed at these locations.

Moreover, as discussed above, the micro-locations of the invention can be formed as flat portions of a substrate surface. This in turn results in forming substantially flat sample surfaces at these locations. Such flat sample surfaces can advantageously enhance the signal-to-noise ratio in fluorescence detection methods.

Yet another advantage of the invention is that it allows providing a higher density of micro-locations on a substrate surface than conventional microarrays. For example, as described above, the methods of the invention can be utilized to generate micro-locations on a substrate surface with a density in a range of about 100,000 to 1000,000 $cm^{-2}$, which is substantially higher than the micro-location densities obtainable by conventional techniques.

Other embodiments and uses of the invention will be apparent to those skilled in the art from consideration of the specification and practice of the invention disclosed herein. For example, methods other than ion bombardment of a substrate that can effect ion implantation in the substrate can also be utilized to practice the present invention. All U.S. Patents and other references noted herein for whatever reason are specifically incorporated by reference. The specification and examples should be considered exemplary only with the true scope and spirit of the invention indicated by the following claims.

What is claimed is:

1. A bioanalytical microarray, comprising:
a surface with a plurality of micro-locations, wherein the plurality of micro-locations is in discrete regions of the surface and forms a pattern, and each of micro-locations has a dose density of implanted ions in a range of about $10^{12}$ to about $10^{17}$ ions/$cm^2$ such that the plurality of micro-locations has a surface energy different from the rest of the surface and functions as potential energy locations, and exhibits a affinity for a compound which is different from the remainder of the surface, and
a plurality of macromolecules confined to the micro-locations.

2. The microarray of claim 1, wherein the dose of the implanted ions is in a range of about $10^{14}$ to about $10^{16}$ ions/$cm^2$ in each of the micro-locations.

3. The microarray of claim 1, wherein the density of the micro-locations present on the surface is in a range of 1 to about 1,000,000 locations/$cm^2$.

4. The microarray of claim 1, wherein the density of the micro-locations present on the surface is in a range of about 100 to about 10,000 locations/$cm^2$.

5. The microarray of claim 1, wherein the surface is one of glass, nylon, amino or carboxyl activated plastic, silane-coated glass, cellulose, and metal-coated glass.

6. The microarray of claim 1, wherein the surface is a semiconductor substrate.

7. The microarray of claim 6, wherein the semiconductor substrate is one of silicon, gallium, arsenide, and gallium nitride.

8. The microarray of claim 1, wherein the macromolecules comprise different macromolecules and at least two of the micro-locations contain the different macromolecules.

9. The microarray of claim 1, wherein the macromolecules are oligonucleotides.

10. The microarray of claim 1, wherein the macromolecules are peptides.

11. The microarray of claim 1, wherein the macromolecules are nucleic acids.

12. The microarray of claim 1, wherein said implanted ions comprise nitrogen or oxygen ions or argon ions or carbon ions or fluorine ions or chlorine ions or hydrogen ions or helium ions.

* * * * *